US Patent [19]  Shaltiel et al.

[11] 4,163,666
[45] Aug. 7, 1979

[54] HYDROGEN CHARGED ALLOYS OF $ZR(A_{1-x}B_x)_2$ AND METHOD OF HYDROGEN STORAGE

[76] Inventors: David Shaltiel, 29 Keren Hayesod St.; Dan Davidov, 18 Neve Shaanan; Isaac Jacob, 14 Kedish Luz St., all of Jerusalem, Israel

[21] Appl. No.: 873,946

[22] Filed: Jan. 31, 1978

[51] Int. Cl.$^2$ .............................................. F17C 11/00
[52] U.S. Cl. ....................................... 75/177; 252/188; 423/645; 423/648 R
[58] Field of Search .............. 75/177; 55/16; 423/645, 423/648 R; 252/188

[56] References Cited

U.S. PATENT DOCUMENTS

| | | | |
|---|---|---|---|
| 3,676,071 | 7/1972 | Speed et al. | 23/212 R |
| 3,922,872 | 12/1975 | Reilly et al. | 62/48 |
| 4,040,410 | 8/1977 | Libowitz | 126/270 |
| 4,069,303 | 1/1978 | Yamadaya et al. | 423/644 |

OTHER PUBLICATIONS

Duffer et al. "———$ZrV_{2-x}Fe_x$———alloys", Phys. Stat. Sol. 31a, (1975) 655.
Pebler et al., "———Systems $ZrCr_2$-$H_2$, $ZrV_2$-$H_2$———", Trans. AIME, 239 (1967), 1593.
Wernick, "Topologically Close-Packed Structure", in Intermetallics ed. J. H. Westbrook, Wiley, 1967, p. 197.

Primary Examiner—L. Dewayne Rutledge
Assistant Examiner—Upendra Roy
Attorney, Agent, or Firm—Browdy and Neimark

[57] ABSTRACT

Hydrogen containing alloys of the formula $Zr(A_{1-x}B_x)_2$ are disclosed in which A designates V, Mn or Cr, B designates Fe or Co, and x is between 0.05 and 0.9. Storage systems for hydrogen comprising such an alloy are also disclosed as well as a method for the controlled storage and release of hydrogen which comprises charging such an alloy with hydrogen and releasing the hydrogen at a desired predetermined rate by heating it to a certain predetermined temperature.

10 Claims, No Drawings

HYDROGEN CHARGED ALLOYS OF ZR(A$_{1-x}$B$_x$)$_2$ AND METHOD OF HYDROGEN STORAGE

SUMMARY OF THE INVENTION

The present invention relates to a novel system for the storage of hydrogen in convenient form, and for its utilization for various purposes, such as means for actuating motor cars and the like. Other and further aspects of the present invention will become apparent hereinafter.

According to geologists, fossil fuel reserves are being rapidly depleted and may well run out in the foreseeable future. This makes it necessary to plan for an economy based on a different fuel. Hydrogen has been proposed to be the basis of such an economy, and various aspects of its storage and distribution and its use as replacement of petroleum and of natural gas have been investigated. One of the problems is the efficient storage and controlled release of hydrogen in a reversible system.

STATE OF THE PRIOR ART

Of special interest is the storage of hydrogen as metal hydride. It is well known that some hydrides contain more hydrogen than does LH$_2$, see Proc. 7th Intersociety Energy Conversion Eng. Conf. San Diego, 1972, p. 1342. Various sytems have been investigated, see the above reference and Reilly et al, *Inorg. Chem.* 1967, 6, 2220; 1968 7, 2254; 1970, 9, 1678; and these systems are exothermic, i.e. heat is evolved when hydrogen is absorbed. Hydrogen can be recovered by dropping the pressure below or by raising the temperature above that required for the absorption process. As all devices which use energy produce waste heat, it should be fairly easy to use this heat to decompose the hydride. At any given temperature the hydride is in equilibrium with a definite pressure of hydrogen, i.e. its decomposition pressure. As hydrogen is withdrawn, its pressure drops an further decomposition takes place until the pressure of th evolved hydrogen again equals the decomposition pressure. Until 1960 the best known storage binary hydride was MgH$_2$, which contains 7.65 per cent hydrogen and has a decomposition temperature of 287° C. at 1 atom H$_2$. Other systems have been investigated, using Mg-Ni and Mg-Cu alloys, see second reference above. Other dihydrides of V, Nb and their alloys as well as AB$_5$ alloys, where A are rear earth metals and B is Fe, Co, Ni or Cu, having also been investigated. Philips Research Rep. 1970, 25, 133. These alloys absorb up to seven atoms of hydrogen per AB$_5$ unit.

The use of iron titanium hydride as a source of hydrogen fuel has also been investigated, see Reily and Wiswall, *Inorg. Chem.* 13, 218 (1974). The alloy used contained a maximum of 2 per cen by weight manganese, which was added to compensate to a certain extent for the high oxygen content of the alloy.

SUMMARY OF THE PRESENT INVENTION

According to the present invention there are provided novel alloys which can be used for the storage and controlled release of hydrogen. The novel alloys are characterized by a high storage capacity of hydrogen and also by convenient temperatures at which they can be reacted with hydrogen to form the hydrides and at which the hydrogen can be released at a controlled rate. The alloys according to the present invention can be represented by the formulas Zr(A$_{1-x}$B$_x$)$_2$ wherein A and B are different from each other, A designates vanadium, chromium, manganese and B designates iron or cobalt, and wherein x is between 0.05 and 0.90. Preferred compounds are of the formulas Zr(V$_{1-x}$Co$_x$)$_2$, Zr(Cr$_1$Fe$_x$)$_2$, Zr(Mn$_{1-x}$Fe$_x$)$_2$ and Zr(Fe$_{1-x}$V$_x$)$_2$.

Preferred alloys absorb 1 atom or more of hydrogen per atom of the molecule and the pressure of release of hydrogen is such that up to 100° C. it is above atmospheric pressure. For example, Zr(A$_{1-x}$B$_x$)$_2$ absorbs about 3 atoms hydrogen per molecule.

One exception is Zr(V$_{0.5}$Co$_{0.5}$)$_2$ wherein the release pressure is lower than atmospheric pressure even at 100° C. and this has been included in the following Tables for comparative purposes only. The data in the following Tables have an accuracy of about +/−5° C. and about +/−10% as regards quantities measured. It is assumed that better results can be obtained when the alloys will be subjected to a thermal pretreatment. The alloy Zr(Fe$_{0.4}$Mn$_{0.6}$)$_2$ absorbs more than 3 molecules of hydrogen and its hydrogen content decreases to about 0.2 molecules per molecule of the alloy at 106° C. The alloy Zr(Fe$_{0.75}$V$_{0.25}$)$_2$ absorbs more than 3 molecules of hydrogen and its hydrogen content decreases to about 0.5 molecules of hydrogen at 106° C. The alloys containing zirconium are comparatively inexpensive. Thus it is possible to charge alloys according to the present invention with hydrogen at lower temperatures and pressures, and this is an important factor in the process of storage and controlled release of hydrogen.

DESCRIPTION OF THE PREFERRED EMBODIMENT

The alloys of the present invention are preferred by conventional means and they are obtained as brittle metal chunks. These are broken up, and brought to the desired mesh size. A mesh size of about 100 to 200 mesh gave satisfactory results for most purposes. It seems that the mesh size is not critical.

The results of extensive experiments with a number of alloys is given in the following Tables which demonstrate the advantageous properties of the novel alloys as storage means for hydrogen and as means for obtaining a controlled release of the hydrogen under comparatively convenient conditions of temperature.

| Zr(V$_{0.5}$Co$_{0.5}$)$_2$ $n_{Hmax}$ = 3.7  p$_{H2}$=15 atm  T = 20° C. | | | | | |
|---|---|---|---|---|---|
| 74° C. | | 106° C. | | 156° C. | |
| P$_{H2}$ | n$_H$ | P$_{H2}$ | n$_H$ | P$_{H2}$ | n$_H$ |
| 13.9 | 3.5 | 15.3 | 3.3 | 14.7 | 3.1 |
| 2.4 | 3.3 | 4.8 | 3.2 | 5.8 | 2.9 |
| 0.25 | 2.9 | 0.9 | 2.9 | 0.9 | 2.4 |
| 0.02 | 2.4 | 0.24 | 2.5 | 0.1 | 1.4 |
| | | 0.05 | 1.9 | 0.03 | 1.0 |
| | | 0.027 | 1.6 | | |

| Zr(V$_{0.25}$Co$_{0.75}$)$_2$ $n_{Hmax}$ = 2.8  p$_{H2}$ = 12.7 atm  T = 20° C. | | | |
|---|---|---|---|
| 48° C. | | 76° C. | |
| P$_{H2}$ | n$_H$ | P$_{H2}$ | n$_H$ |
| 12.9 | 2.1 | 15.3 | 2.3 |
| 5 | 1.7 | 11.0 | 2.0 |
| 2.8 | 1.3 | 4.7 | 1.0 |
| 1.4 | 0.3 | 1.3 | 0.1 |
| 0.8 | 0.2 | | |

| | |
|---|---|
| 0.4 | 0.06 |

| Zr(Cr$_{0.5}$Fe$_{0.5}$)$_2$ |||||
|---|---|---|---|---|
| n$_{Hmax}$ = 3.5 | p$_{H2}$ = 14.6 atm | T = 20° C. ||||
| 85° C. || 110° C. ||
| p$_{H2}$ | n$_H$ | p$_{H2}$ | n$_H$ |
| 11.4 | 2.85 | 13.7 | 2.8 |
| 5.6 | 2.7 | 4.8 | 2.5 |
| 1.3 | 2.3 | 2.7 | 2.2 |
| 0.8 | 2 | 2.3 | 2 |
| 0.6 | 0.7 | 1.9 | 0.6 |
| 0.4 | 0.2 | 0.5 | 0.2 |
| 0.04 | 0 | 0.1 | 0.07 |

| Zr(Cr$_{0.25}$Fe$_{0.75}$)$_2$ ||||||
|---|---|---|---|---|---|
| n$_{Hmax}$ = 2.9 | p$_{H2}$=15.5 atm | T = 20° C. |||||
| 205° C. || 35° C. || 49° C. ||
| p$_{H2}$ | n$_H$ | p$_{H2}$ | n$_H$ | p$_{H2}$ | n$_H$ |
| 13.2 | 2.5 | 13.2 | 2.7 | 13 | 2.5 |
| 7.0 | 2.4 | 6.1 | 2.5 | 6.3 | 2.2 |
| 2.1 | 2.0 | 2.4 | 1.9 | 2.2 | 0.2 |
| 1.3 | 0.5 | 1.1 | 0.5 | 0.5 | 0.04 |
| 0.6 | 0.1 | 0.4 | 0.3 | | |
| | | 0.001 | 0 | | |

| Zr(Mn$_{0.6}$Fe$_{0.4}$)$_2$ ||||
|---|---|---|---|
| n$_{Hmax}$ = 3.1 | p$_{H2}$ = 14.0 atm | T = 20° C. |||
| 18° C. || 106° C. ||
| p$_{H2}$ | n$_H$ | p$_{H2}$ | n$_H$ |
| 5.5 | 2.4 | 8.0 | 2.4 |
| 2.5 | 1.7 | 4.3 | 1.7 |
| 1.4 | 1.0 | 2.6 | 1.0 |
| 0.9 | 0.5 | 1.7 | 0.5 | n$_H$ = Number of absorbed hydrogen atoms per molecule
p$_H$ = Hydrogen pressure in atmospheres

| Thermodynamic properties of some of the Hydrides studied: |||||
|---|---|---|---|---|
| Compound | Hydrogen capacity[a] n$_H$(H atoms molecule$^{-1}$) | heat of formation ΔH (kcal mol$^{-1}$) | Entropy change ΔS (cal mol$^{-1}$K$^{-1}$) | Plateau pressure p$_{eq}$[b](atm) |
| | | | | at 50° C. / at 80° C. |
| Zr(Fe$_{0.5}$V$_{0.5}$)$_2$* | 3.2(15) | −11.5 | −22.4 | 0.0012 / 0.0056 |
| Zr(Fe$_{0.75}$V$_{0.25}$)$_2$* | 3.2(15) | −7.7 | −21.0 | 0.25 / 0.7 |
| Zr(Fe$_{0.5}$Cr$_{0.5}$)$_2$* | 3.4(15) 3.7(40) | −11.8 | −32 | 0.1 / 0.6 |
| Zr(Fe$_{0.75}$Cr$_{0.25}$)$_2$* | 2.85(15) | −5.8 | −22 | 5.5 / 12 |
| Zr(Fe$_{0.4}$Mn$_{0.6}$)$_2$* | 3.2(13.5) | −7.9 | −23 | 0.4 / 1.4 |
| Zr(Fe$_{0.5}$Mn$_{0.5}$)$_2$* | 2.9(15) | −7.2 | −21.4 | 0.65 / 1.65 |
| Zr(Co$_{0.5}$V$_{0.5}$)$_2$* | 3.7(15) | −11.8 | −24.3 | 0.0023 / 0.01 |
| Zr(CO$_{0.75}$V$_{0.25}$)$_2$* | 3 (15) | −8.2 | −26.2 | 1.5 / 4.5 |
| Zr(Co$_{0.5}$Cr$_{0.5}$)$_2$* | 3.2(15) | −9.6 | −29 | 0.7 / 2.5 |
| Zr(Co$_{0.75}$Cr$_{0.25}$)$_2$ | 1.6(15) 2(70)[c] | d | d | d / d |
| Zr(Co$_{0.25}$Mn$_{0.75}$)$_2$* | 3.4(15) | −10.6 | −28 | 0.08 / 0.3 |
| Zr(Co$_{0.4}$Mn$_{0.6}$)$_2$* | 3.1(15) | −8.6 | −25.2 | 0.5 / 1.6 |
| Zr(Co$_{0.5}$Mn$_{0.5}$)$_2$ | 3.1(15) | −8.3 | −26 | 1.2 / 3.7 |

*[a]Measured at room temperature (18 - 24° C.) at the pressures indicated in parentheses in column 2. [b]Obtained by extrapolation or interpolation. [c]For this compound the capacity n$_H$ changes drastically upon changing the temperature by several degrees. For instance, we obtained, at 24° C., n$_H$ = 0.4 (12), n$_H$ = 1.2 (60); the values above were measured at 18° C.
[d]Could not be determined because of the absence of defined plateau pressure in the isotherm. It is believed that T$_c$(see text) is below room temperature for this compound.

What is claimed is:

1. A compound comprising a hydride of an alloy of the general formula $$Zr(A_{1-x}B_x)_2$$

wherein A desigantes Mn, V or Cr, B fesignates Fe or Co and x is a value between 0.25 and 0.75.

2. A compound according to claim 1, of the formula Zr(V$_{1-x}$Co$_x$)$_2$.

3. A compound according to clam 1, of the formula Zr(Cr$_{1-x}$Fe$_x$)$_2$.

4. A compound according to claim 1, of the formula Zr(Mn$_{1-x}$Fe$_x$)$_2$.

5. A compound according to claim 1, of the formula Zr(V$_{1-x}$Fe$_x$)$_2$.

6. A compound according to clam 1, of the formula Zr(Cr$_{1-x}$Co$_x$)$_2$.

7. A compound according to claim 1, of the formula Zr(Mn$_{1-x}$Co$_x$)$_2$.

8. A compound according to claim 1 wherein x is a value between 0.2 and 0.85.

9. A compound in accordance with claim 1, wherein said hydride comprises at least one atom of hydrogen per molecule of alloy.

10. A method for the controlled storage and release of hydrogen which comprises charging an alloy of the general formula $$Zr(A_{1-x}B_x)_2$$

wherein A designates Mn, V or Cr, B designates Fe or Co and x is a value between 0.25 and 0.75; with hydrogen, and releasing the hydrogen at a predetermined rate by applying a suitable temperature.

* * * * *